United States Patent
Yanase et al.

(10) Patent No.: US 6,333,455 B1
(45) Date of Patent: Dec. 25, 2001

(54) ELECTRONIC SCORE TRACKING MUSICAL INSTRUMENT

(75) Inventors: Kazuya Yanase; Nobuhiro Yamada; Kazuhiko Matsuoka, all of Shizuoka (JP)

(73) Assignee: Roland Corporation, Osaka (JP)

( * ) Notice: Subject to any disclaimer, the term of this patent is extended or adjusted under 35 U.S.C. 154(b) by 0 days.

(21) Appl. No.: 09/656,403

(22) Filed: Sep. 6, 2000

(30) Foreign Application Priority Data

Sep. 7, 1999 (JP) ................................................ 11-253157

(51) Int. Cl.⁷ .............................. G09B 15/00; G10H 1/26
(52) U.S. Cl. ........................................... 84/609; 84/470 R
(58) Field of Search ..................... 84/609–614, 634–638, 84/470 R, 477 R, 478

(56) References Cited

U.S. PATENT DOCUMENTS

| | | | |
|---|---|---|---|
| 3,522,358 | 7/1970 | Cambell | 84/1.03 |
| 3,946,504 | 3/1976 | Kakano | 35/35 C |
| 4,341,140 | 7/1982 | Ishida | 84/1.03 |
| 4,471,163 | 9/1984 | Donald et al. | 178/22.08 |
| 4,484,507 | 11/1984 | Nakada et al. | 84/1.03 |
| 4,485,716 | 12/1984 | Koike | 84/1.03 |
| 4,506,580 | 3/1985 | Koike | 84/1.01 |
| 4,562,306 | 12/1985 | Chou et al. | 178/22.08 |

(List continued on next page.)

FOREIGN PATENT DOCUMENTS

| | | |
|---|---|---|
| 0 488 732 A2 | 11/1991 | (EP) . |
| WO 98/58364 | 12/1998 | (EP) . |
| 7-261751 | 10/1995 | (JP) . |

OTHER PUBLICATIONS

Todd Machover and Joseph Chung, *Hyperinstruments Musically Intelligent/Interactive Performance and Creativity Systems*, 1988, pp. 1–41.

(List continued on next page.)

*Primary Examiner*—Stanley J. Witkowski
(74) *Attorney, Agent, or Firm*—Foley & Lardner

(57) ABSTRACT

A system to automatically stop an automatic performance by means of automatic performance techniques in conformance with the performance by the performer and to alleviate the stress of the performer is described herein. It has a storage means in which the performance data from a multiple number of parts are stored and an automatic performance means in which the performance data that have been stored in the above mentioned storage means are performed automatically and an input means in which optional performance data are input and a comparison means in which the performance data that have been input by the above mentioned input means and the performance data from a specified part that have been stored in the above mentioned storage means are compared and an automatic performance termination control means in which, in those cases where, as a result of the comparison by the above mentioned comparison means, a comparison result that the performance data that have been input by the above mentioned input means and the performance data from a specified part that have been stored in the above mentioned storage means are not in agreement has continued for a specified period of time or longer, the automatic performance by the above mentioned automatic performance means is terminated.

20 Claims, 3 Drawing Sheets

U.S. PATENT DOCUMENTS

| | | | |
|---|---|---|---|
| 4,593,353 | 6/1986 | Pickholtz | 364/200 |
| 4,602,544 | 7/1986 | Yamada et al. | 84/1.01 |
| 4,621,321 | 11/1986 | Boebert et al. | 364/200 |
| 4,630,518 | 12/1986 | Usami | 84/1.03 |
| 4,651,612 | 3/1987 | Matsumoto | 84/1.03 |
| 4,685,055 | 8/1987 | Thomas | 364/200 |
| 4,688,169 | 8/1987 | Joshi | 364/200 |
| 4,740,890 | 4/1988 | William | 364/200 |
| 4,745,836 | 5/1988 | Dannenberg | 84/1.03 |
| 4,805,217 | 2/1989 | Morihiro et al. | 381/35 |
| 4,876,937 | 10/1989 | Suzuki | 84/612 |
| 5,034,980 | 7/1991 | Kubota | 380/4 |
| 5,056,009 | 10/1991 | Mizuta | 364/200 |
| 5,113,518 | 5/1992 | Durst, Jr. et al. | 395/550 |
| 5,131,091 | 7/1992 | Mizuta | 395/725 |
| 5,153,593 | 10/1992 | Walden et al. | 341/143 |
| 5,177,311 | 1/1993 | Suzuki et al. | 84/600 |
| 5,192,823 | 3/1993 | Suzuki et al. | 84/600 |
| 5,194,682 | 3/1993 | Okamura et al. | 84/625 |
| 5,298,672 | 3/1994 | Gallitzendorfer | 84/603 |
| 5,305,004 | 4/1994 | Fattaruso | 341/120 |
| 5,315,057 | 5/1994 | Land et al. | 84/601 |
| 5,315,060 | 5/1994 | Paroutaud | 84/726 |
| 5,315,911 | 5/1994 | Ochi | 84/477 R |
| 5,347,083 | 9/1994 | Suzuki et al. | 84/613 |
| 5,347,478 | 9/1994 | Suzuki et al. | 364/715.02 |
| 5,350,881 | 9/1994 | Kashio et al. | 84/622 |
| 5,357,045 | 10/1994 | Tabei | 84/603 |
| 5,412,152 | 5/1995 | Kageyama et al. | 84/607 |
| 5,455,378 | 10/1995 | Paulson et al. | 84/610 |
| 5,466,882 | 11/1995 | Lee | 84/603 |
| 5,471,009 | 11/1995 | Oba et al. | 84/645 |
| 5,491,751 | 2/1996 | Paulson et al. | 380/25 |
| 5,499,316 | 3/1996 | Sudoh et al. | 395/2.79 |
| 5,511,000 | 4/1996 | Kaloi et al. | 364/514 A |
| 5,521,323 | 5/1996 | Paulson et al. | 84/610 |
| 5,521,324 | 5/1996 | Dannenberg et al. | 84/612 |
| 5,570,424 | 10/1996 | Araya et al. | 381/61 |
| 5,585,585 | 12/1996 | Paulson et al. | 84/610 |
| 5,611,018 | 3/1997 | Tanaka et al. | 395/2.24 |
| 5,619,004 | 4/1997 | Dame | 811/616 |
| 5,641,926 | 6/1997 | Gibson et al. | 84/603 |
| 5,648,627 | 7/1997 | Usa | 84/600 |
| 5,675,709 | 10/1997 | Chiba | 395/2.87 |
| 5,693,903 | 12/1997 | Heidorn et al. | 84/668 |
| 5,708,433 | 1/1998 | Craven | 341/144 |
| 5,712,635 | 1/1998 | Wilson et al. | 341/144 |
| 5,713,021 | 1/1998 | Kondo et al. | 395/614 |
| 5,714,702 | 2/1998 | Ishii | 84/462 |
| 5,717,818 | 2/1998 | Nejime et al. | 395/2.2 |
| 5,719,944 | 2/1998 | Banerjea | 381/61 |
| 5,726,371 | 3/1998 | Shiba et al. | 84/603 |
| 5,734,119 | 3/1998 | France et al. | 84/622 |
| 5,744,739 | 4/1998 | Jenkins | 84/603 |
| 5,744,742 | 4/1998 | Lindemann et al. | 84/623 |
| 5,745,650 | 4/1998 | Otsuka et al. | 395/2.69 |
| 5,763,800 | 6/1998 | Rossum et al. | 84/603 |
| 5,765,129 | 6/1998 | Hyman et al. | 704/270 |
| 5,774,863 | 6/1998 | Okano et al. | 704/278 |
| 5,781,696 | 7/1998 | Oh et al. | 395/2.79 |
| 5,784,017 | 7/1998 | Craven | 341/126 |
| 5,792,971 | 8/1998 | Timis et al. | 84/609 |
| 5,809,454 | 9/1998 | Okada et al. | 704/214 |
| 5,837,914 | 11/1998 | Schwartz et al. | 84/622 |
| 5,847,303 | 12/1998 | Matsumoto | 84/610 |
| 5,873,059 | 2/1999 | Iijma et al. | 704/207 |
| 5,913,259 | 6/1999 | Grubb et al. | 84/610 |
| 5,917,917 | 6/1999 | Jenkins et al. | 381/63 |
| 5,936,859 | 8/1999 | Huang et al. | 364/400.01 |
| 5,952,597 | 9/1999 | Weinstock et al. | 84/609 |
| 6,072,113 * | 6/2000 | Tohgi et al. | 84/470 R |

OTHER PUBLICATIONS

Robert Rowe, *Implememting Real–Time Musical Intelligence*, 1989, pp. 1–34.

Deta S. Davis, The Computer Music and Digital Audio Series vol. 10 *Computer Applications In Music A Bibliography Supplement1*, pp. 151, 230, 276, and 561.

* cited by examiner

ELECTRONIC SCORE TRACKING MUSICAL INSTRUMENT

PRIORITY

This application relates to Japanese Patent Application Number Hei 11-253157 filed on Sep. 7, 1999, which is incorporated by reference and from which priority is claimed.

FIELD OF THE INVENTION

The present invention relates to an electronic musical instrument and, in further detail, it relates to an electronic musical instrument that is furnished with an automatic performance means in which performance data is performed automatically.

BACKGROUND OF THE INVENTION

Electronic musical instruments have been furnished with an automatic performance means in which performance data for musical compositions that have been stored in advance are performed automatically. These kinds of electronic musical instruments are typically set up so that a performer can carry out a performance with said electronic musical instrument to match the automatic performance of the performance data by the automatic performance means and, by this means, it is possible for the performer to practice to attempt to improve his or her performance technique.

However, in such prior electronic musical instruments as that described above, even if the performer makes a mistake in the performance or the performer does not know the music that should be performed and stops the performance, the automatic performance by the automatic performance means keeps on playing by itself. Because of this, the performer has not been able to carry out an automatic performance.

With the phenomenon described above in which, irrespective of whether the performer makes a mistake or stops the performance, the automatic performance does not stop and steadily continues ahead by itself, the performer may not be able to carry out an automatic performance. Accordingly, there has been a problem with regard to providing psychological pleasure to those, such as beginners, who are not familiar with the musical instrument performance.

SUMMARY OF THE DISCLOSURE

Accordingly, to overcome limitations in the prior art described above, and to overcome other limitations that will become apparent upon reading of the present specifications, the present invention is one that was made taking into consideration the above mentioned problems of the prior art. In order to achieve that objective, an electronic musical instrument is presented that compares the performance data of the parts that the performer performs from, among the automatic performance, a multiple number of parts and the performance condition of the performer and, in the case where it is determined that the performer is not carrying out the performance normally, automatically stops the automatic performance.

In order to achieve the above mentioned objective according to embodiments of present invention, a comparison is made of the performance of the performer with the automatic performance by the automatic performance means and, in the case where a specified period of time has passed after the two are not in agreement, automatically stops the automatic performance by the automatic performance means.

In other words, one embodiment of the present invention has a storage means in which the performance data from a multiple number of parts are stored and an automatic performance means in which the performance data that have been stored in the above mentioned storage means are performed automatically and an input means in which optional performance data are input and a comparison means in which the performance data that have been input by the above mentioned input means and the performance data from a specified part that have been stored in the above mentioned storage means are compared and an automatic performance termination control means in which, in those cases where, as a result of the comparison by the above mentioned comparison means, a comparison result that the performance data that have been input by the above mentioned input means and the performance data from a specified part that have been stored in the above mentioned storage means are not in agreement has continued for a specified period of time or longer, the automatic performance by the above mentioned automatic performance means is terminated.

Accordingly, in accordance with the above embodiment of the present invention, in the case where the state in which the performance data that have been input by the performance means and the performance data from a specified part that has been stored in the storage means are not in agreement continues for a specified period of time or more, the automatic performance by the automatic performance means is stopped automatically.

Here, the meaning of "not in agreement" includes a case in which, without regard to whether or not performance data for the part that carries out the performance by the performer exists, no performance has been carried out or, in the case where a performance is carried out but, due to the fact that a different key has been pushed, the pitch is different or, the case where, even though the pitches are in agreement, the timing of the key pressing and releasing differs and these cases are detected as the areas that are not in agreement. For the timing of key pressing and the timing of key releasing, the allowable range at the time of non-agreement is established.

Incidentally, the above mentioned "storage means" corresponds to the "performance data memory 18" in the preferred embodiment for which an explanation will be given below (as will be discussed later, the performance data memory 18 is composed of random access memory (RAM)), however, it is, of course, not limited to this. Various kinds of storage systems such as, but not limited to, read only memory (ROM), hard disks or floppy disks may be employed as the "storage means."

In addition, the performance data that are stored in the "storage means" may be performance data for a single musical composition or may be performance data for a multiple number of musical compositions.

In addition, in the case where the performance data for a multiple number of musical compositions are stored in the "storage means," the multiple number of musical compositions that have been stored in the "storage means" may be performed automatically in order, or operators may be established with which the performance data for desired musical compositions are selected from among the multiple number of musical compositions that have been stored in the "storage means" (these correspond to the "musical composition selection operators" in the preferred embodiment for which an explanation will be given below) and the desired musical compositions that have been selected by said operators may be performed automatically.

In addition, the above mentioned "input means" corresponds to the "keyboard system 20" in the preferred embodiment, for which an explanation is given below.

Incidentally, the "input means" is, of course, not limited to the "keyboard system 20" in the preferred embodiment. It may be a musical instrument type of input system such as a device that simulates a percussion instrument, a device that simulates a stringed instrument or an input system like a computer keyboard or a mouse.

In addition, the above mentioned "automatic performance means," "comparison means" and "automatic performance termination means" correspond to the control contents that are accomplished by the "central processing unit (CPU) 10" of a preferred embodiment, for which an explanation is given below.

In accordance with a further embodiment of the invention, the comparison means is configured so that the pitch and timing that denote the performance data that have been input by the above mentioned input means and the pitch and timing that denote the performance data from a specified part that have been stored by the above mentioned storage means can be compared.

In addition, the above mentioned comparison means may be configured so that the Note On of the performance data that have been input by the above mentioned input means and the Note On of the performance data for a specified part that have been stored in the above mentioned storage means can be compared and so that the Note Off of the performance data that have been input by the above mentioned input means and the Note Off of the performance data for a specified part that have been stored in the above mentioned storage means can be compared.

DETAILED DESCRIPTION OF PREFERRED EMBODIMENTS

Below, a detailed explanation will given of one example of a preferred embodiment of the electronic musical instrument in accordance with embodiments of the present invention.

Figure 1:
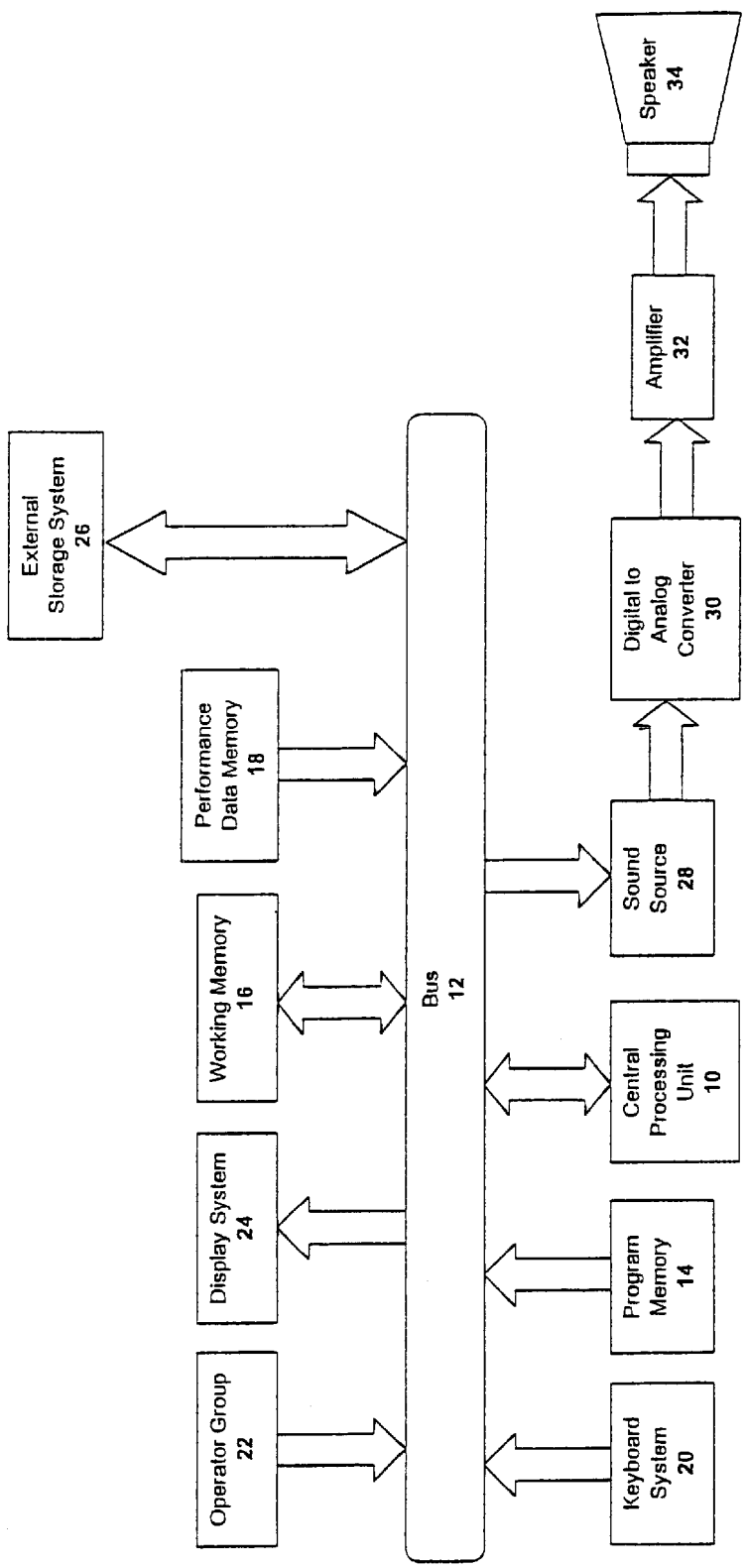
FIG. 1 is a block structural diagram of an electronic musical instrument in accordance with one example of a preferred embodiment of the present invention.

In FIG. 1, a block structural diagram of the electronic musical instrument in accordance with one example of a preferred embodiment of the present invention is shown.

This electronic musical instrument is configured so that its entire operation is controlled using the Central Processing Unit (CPU) 10.

In addition, connected to the CPU 10 through the bus 12 is the program memory 14 that stores such things as the programs that are executed by the CPU 10 in order to control the operations as are shown in the flowcharts which will be discussed later (incidentally, the program memory is composed of ROM). Also connected to the CPU 10 through the bus 12 are the working memory 16 which provides a working area in which are established the various kinds of buffers and registers that are used for the execution of the programs by the CPU 10 (incidentally, the working memory is composed of RAM) and the performance data memory 18 which stores the musical composition portions for the performance data that are made up from a multiple number of parts (incidentally, the performance data memory is composed of RAM). The keyboard system 20 is also connected to the CPU 10 through the bus 12 to allow the performer to input the musical tone generation instruction (the sound generation instruction: Note On) and the musical tone generation termination instruction (the sound cancellation instruction: Note Off) by means of a key pressing operation and a key releasing operation and carry out the performance. The operator group 22 is also connected to the bus 12 and is made up of such things as the musical composition selection operators with which operation is done in order to select the desired performance data from among the multiple number of musical composition performance data that have been stored in the performance data memory 18. The display system 24 is also connected to the bus 12 and displays such things as the operation state of the operators 22. The external storage system 26 is also connected to the bus 12 and stores the performance data from the multiple number of parts as a multiple number of musical composition portions. The sound source 28 is also connected to the bus 12 and carries out the generation of the music tone signal in conformance with the Note On and Note Off, which are the performance data that are input by the key pressing operation and the key releasing operation of the keyboard system 20 and, together with this, carries out the generation of the musical tone signal in conformance with the automatic performance in accordance with the read-out of the performance data that have been stored in the performance data memory 18.

In addition, the digital to analog converter (D/A) 30 for the conversion of the musical tone signal that has been generated by the sound source 28 (the digital musical tone signal) into an analog musical tone signal is connected to the signal source 28. The amplifier 32 for the amplification of the analog musical tone signal is connected to the D/A 30 and the speaker 34 is connected to the amplifier 32 for the radiation of the analog musical tone signal that has been amplified by the amplifier 32.

In other words, in this electronic musical instrument, the musical tone signal that has been generated by the sound source 28 is radiated in space as a musical tone through the D/A 30, the amplifier 28 and the speaker 34.

Incidentally, the external storage system 26 that was mentioned above, is composed of, for example, but not limited to, a hard disk or a floppy disk. In addition, the electronic musical instrument is configured so that, in conformance with the operation of a specified operator from among the operator group 22, the performance data that have been stored in the external storage system 26 are read out and stored in the performance data memory 18.

An explanation of the operation of this electronic musical instrument with the above configuration will be given while referring to the appended flow charts.

The performer first selects the musical composition that the performer desires to practice from among the multiple number of musical compositions that are stored in the performance data memory.

Next, he or she selects the part that is to be practiced from among the multiple number of parts of the musical composition that has been selected. For example, if the musical composition is a piano composition, either one of the right hand part or the left hand part or both the right hand part and the left hand part is selected.

Next, the performance tempo is set. For the automatic performance, the insertion of the time interval in conformance with the tempo that has been set is done for the CPU 10 and is carried out by the execution of the Tick insertion processing.

Here, for example, if the tempo is 120, the length of four quarter notes is 500 msec and the resolution is made 100 then, the time interval for the execution of the tick insertion processing becomes 5 msec. In other words, in this case, the tick insertion processing is executed every 5 msec.

In addition, in the explanation that will be given below, such things as the internal processing of the sound source 28 that accompanies the automatic performance in accordance with key pressing operation and the key releasing operation of the keyboard system 20, as well as the read-out of the performance data that have been stored in the performance data memory 18 and the insertion processing that conforms to the operation of such things as musical composition operators that comprise the operator group 22, are not related to the implementation of the present invention and, furthermore, may employ well known technologies.

Incidentally, in this electronic musical instrument, when the start button, which is an operator that is comprised by the operator group 22, is operated, the value of the Tick register, which is the register that indicates the current time, is cleared to 0 as the initial setting. In addition, the time data of the initial performance Event of the performance data are set in the Event register, which is the register that indicates the time data that exist for the performance event in the performance data that are read out from the performance data memory 18. In addition, the value of the Di Tick register, which is the register that stores the value of the Tick register when the Note On in accordance with the key pressing operation of the keyboard system 20 and the Note On of the performance data that have been read out from the performance data memory 18 are not in agreement, or when the Note Off in accordance with the key pressing operation of the keyboard system 20 and the Note Off of the performance data that have been read out from the performance data memory 18 are not in agreement, is cleared to 0 and then the execution of the tick insertion processing is permitted.

By means of the permitting of the execution of the tick insertion processing, the read-out of the performance data from the performance memory 18 is carried out, the sound source 28 is controlled and the automatic performance is done.

Then, together with the start of the automatic performance in accordance with the read-out of the performance data from the performance data memory 18, the performer also starts his or her own performance by means of the key pressing operation and key releasing operation of the keyboard system so as to match said automatic performance.

In addition, in this electronic musical instrument, when the stop button, which is an operator that is comprised by the operator group 22 is operated, the execution of the Tick insertion processing is terminated. By means of the termination of the execution of the Tick insertion processing, the read-out of the performance data from the performance data memory 18 is halted and, with this, the automatic performance is terminated.

Accordingly, in those cases where it is desired to immediately halt the automatic performance in accordance with the read-out of the performance data from the performance data memory 18, it is only necessary to operate the stop button that is within the operator group 22.

Figure 2:
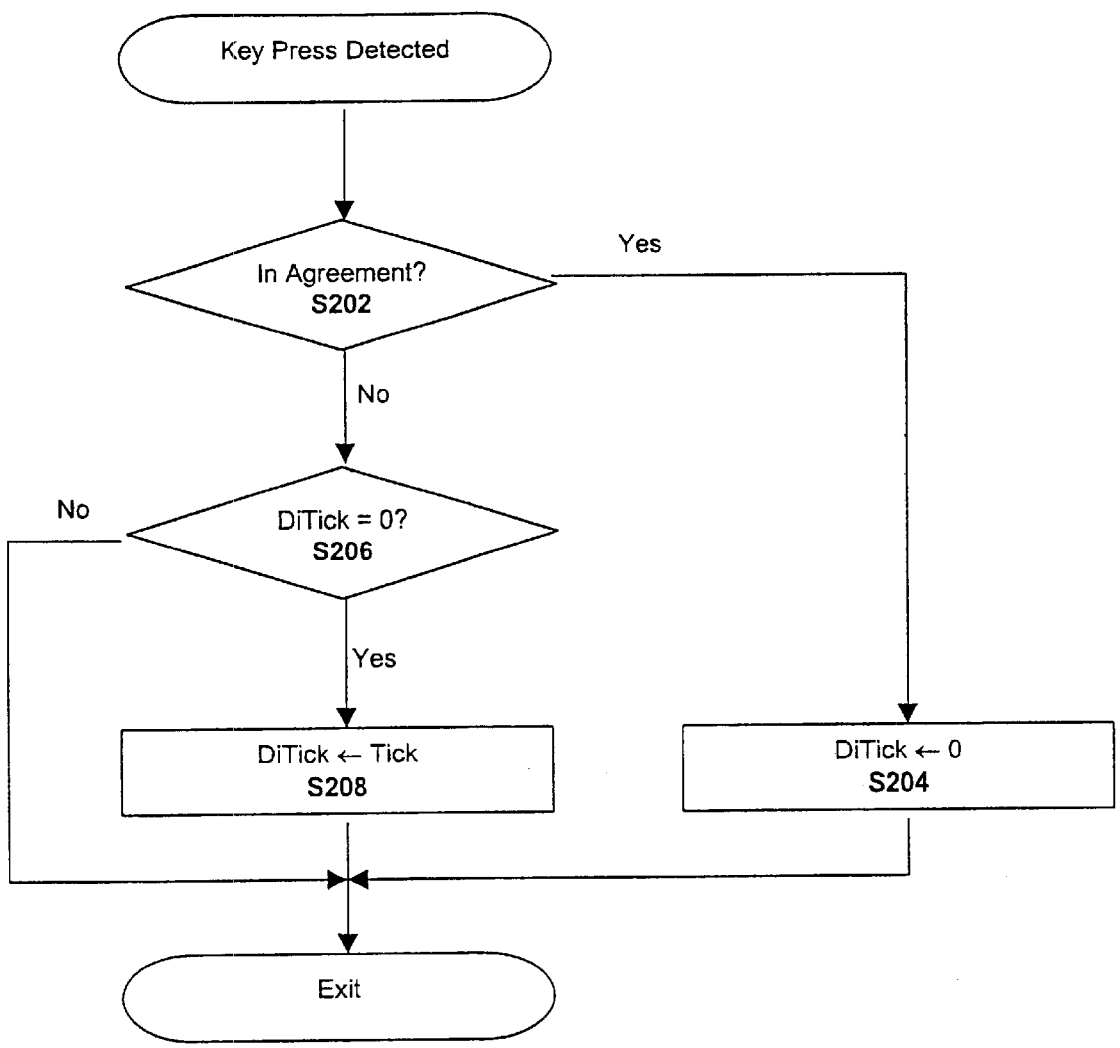
FIG. 2 is a flowchart that shows the key pressing and key releasing insertion processing.

Next, an explanation will be given regarding the key pressing and key releasing insertion processing in the case where a key pressing operation or a key releasing operation of the keyboard system 20 has been detected while referring to the flow chart that is shown in FIG. 2.

A key pressing and key releasing insertion processing flow chart is shown in FIG. 2. In FIG. 2, first, when a key pressing operation or a key releasing operation of the keyboard system 20 has been detected, a determination is made as to whether or not the part that the performer performs with the key pressing operation and key releasing operation of the keyboard 20 and the part of the performance data that have been read out from the performance data memory 18 are in agreement and, moreover, whether or not the Note On and Note Off that are the performance data in accordance with said key pressing operation and key releasing operation and the Note On and Note Off of the performance data that have been read out from the performance data memory 18 are in agreement (Step S202).

Specifically, as the determination processing of Step 202 in this preferred embodiment, the Notes On in accordance with the four immediately preceding key pressing operations of the keyboard 20 and the Notes Off in accordance with the four immediately preceding key releasing operations are stored in the working memory 16. In the case where the a key pressing operation of the keyboard 20 has been detected, each of the pitches and timings of the Notes On in accordance with the four immediately preceding key pressing operations is compared with each of the pitches and timings of the Notes On of the performance data that have been read out from the performance data memory 18 and a determination is made as to whether or not each of them is in agreement or not. In addition, in the case where a key releasing operation of the keyboard 20 has been detected, each of the pitches and timings of the Notes Off in accordance with the four immediately preceding key pressing operations is compared with each of the pitches and timings of the Notes Off of the performance data that have been read out from the performance data memory 18 and a determination is made as to whether or not each of them is in agreement.

Here, for the determination as to whether or not the timings are in agreement, the allowable range of timing variation is set. If the timing variation is within said allowable range, it is viewed as being in agreement.

Incidentally, it is preferable to set the allowable range of variation between the timing of the Note On in accordance with the key pressing operation of the keyboard system 20 and the timing of the Note On of the performance data that have been read out from the performance data memory 18 narrow and to set the allowable range of variation between the timing of the Note Off in accordance with the key pressing operation of the keyboard system 20 and the timing of the Note Off of the performance data that have been read out from the performance data memory 18 wide.

In addition, the above mentioned allowable range is established so that it is possible to set it to any value desired by means of a specified operator that is comprised by the operator group 22. Accordingly, the performer may set the value of the allowable range as desired to conform to his or her own level of performance technique.

Incidentally, in this preferred embodiment as described above, the comparison is carried out with respect to the four immediately proceeding key pressings and key releasings. However, in those cases where a multiple number of keys are pressed at the same time or within a short period, these key pressings may be regarded as a single group and treated as equal to a single key pressing.

Here, in the case where the pitch of a group is compared, for example, it may be done so that only the highest pitch in the group is compared.

In addition, in the case where the performer is a beginner and in the case where, also, only the key of the highest pitch in the group has been pressed, it may be determined to be in agreement.

Furthermore, in the above mentioned manner, in this preferred embodiment, at the time that the comparison is carried out with respect to the four immediately previous four key pressings and key releasings, when there is even one error, there is non-agreement also in three comparisons that follow that but in the case where among the four key pressings, two do not agree, it may be set up so that a determination of "non-agreement" is made.

In other words, the allowable range that is determined as "in agreement" may be set up so that it is determined by the total of the pitches and timings of four key pressings and the timings of the key releasings.

In addition, in the determination processing of Step S202, in the case where the part that the performer performs with key pressing operations and key releasing operations of the keyboard system 20 and the part of the performance data that have been read out from the performance data memory 18 are in agreement and, moreover, a determination has been made that the Note On and Note Off in accordance with the key pressing operation and the key releasing operation are in agreement with the Note On and Note Off of the performance data that have been read out from the performance data memory 18, the procedure proceeds to the processing of Step S204, the value of the Di Tick register that has been set in the working memory 16 is cleared to 0 and, following that, the flowchart processing terminates.

On the other hand, in the determination processing of Step S202, in the case where the part that the performer performs with key pressing operations and key releasing operations of the keyboard system 20 and the part of the performance data that have been read out from the performance data memory 18 are not in agreement and where a determination has been made that the Note On and Note Off in accordance with the key pressing operation and the key releasing operation are not in agreement with the Note On and Note Off of the performance data that have been read out from the performance data memory 18, the process proceeds to the processing of Step S206 and a determination is made as to whether or not the value of the Di Tick register is 0.

In the determination processing of Step S206, in the case where a determination has been made that the value of the Di Tick register is 0, the process proceeds to Step S208, the value of the Tick register which indicates the current time is stored in the Di Tick register and, following that, the flow chart processing terminates.

On the other hand, in the determination processing of Step S206, in the case where the value of the Di Tick register is not 0, since in accordance with the key pressing operation and key releasing operation insertion processing that has already been executed, a determination has been made that the part that the performer performs by the key pressing operation and key releasing operation of the keyboard system 20 and the part of the performance data that has been read out from the performance data memory 18 are not in agreement, the Notes On and Notes Off in accordance with the key pressing operations and key releasing operations, the Notes On and Notes Off of the performance data that have been read out from the performance data memory 18 are not in agreement and the value of the Tick register that indicates the current time at that time is stored in the Di Tick register and the processing of the flowchart terminates as it is.

Figure 3:
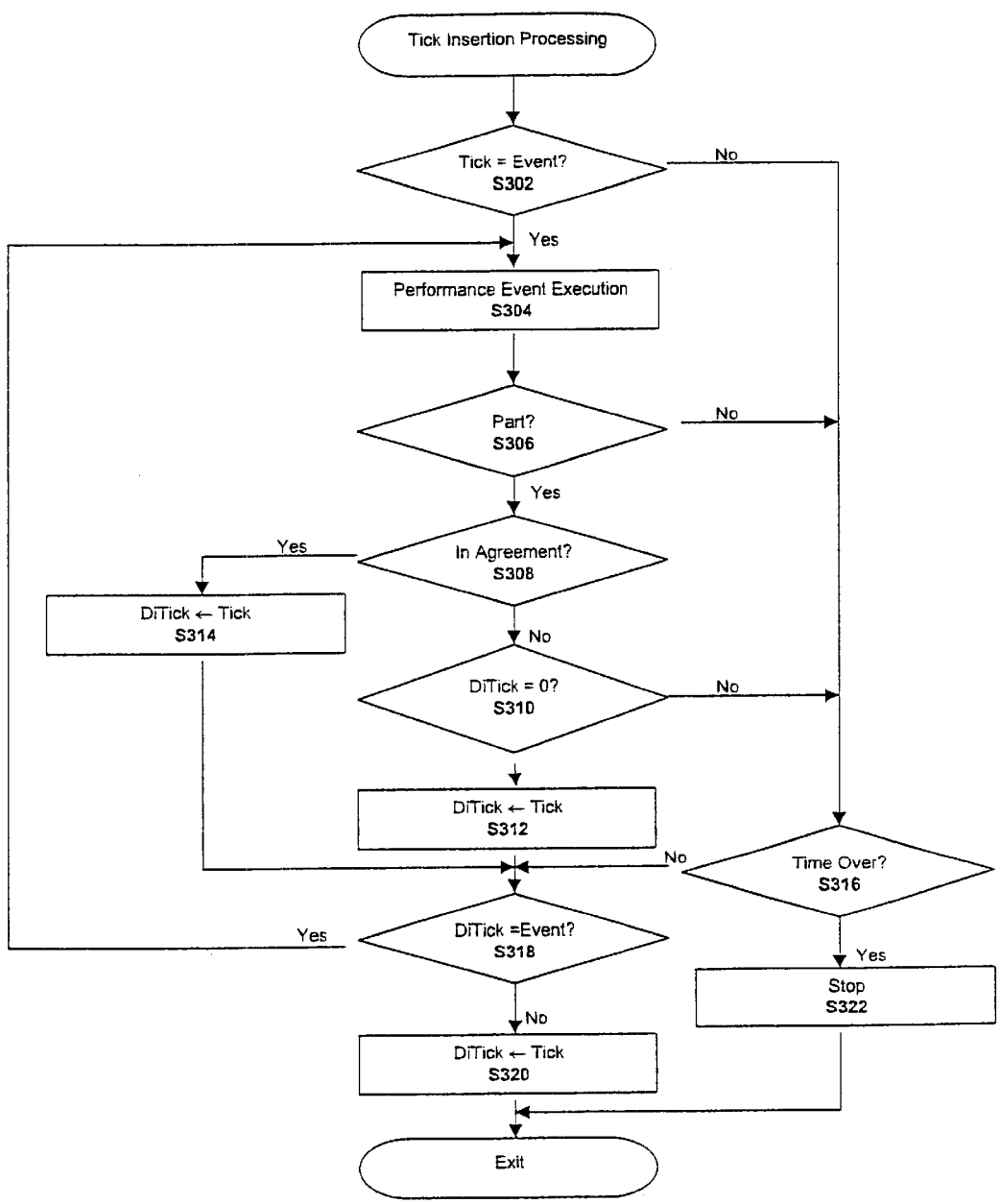
FIG. 3 is a flowchart that shows the tick insertion processing.

Next, an explanation will be given concerning the Tick insertion processing while referring to the flowchart that is shown in FIG. 3.

Then, in the Tick insertion processing of the flowchart that is shown in FIG. 3, first, a determination is made as to whether or not the value of the Tick register that indicates the current time and the value of the Event register are in agreement (Step S302).

In the determination processing of Step S302, in the case where a determination has been made that the value of the Tick register which indicates the current time and the value of the Event register are in agreement, since it becomes the performance event that should be executed at the current time, the process proceeds to the processing of Step S304, the performance event for that current time is executed, the time data for the next performance event are assigned to the Event register and the value of the Event register is updated.

Here, with regard to the specifics of the processing for the execution of the performance event that is at the current time, the performance event that is at the current time is read out and output to the sound source 28 and the control of the sound source 28 is carried out. In other words, the reading out of the performance data from the performance data memory 18 is carried out, the sound source 28 is controlled and the automatic performance is done.

Then, in this preferred embodiment, in the case where the performance event that is at the current time is the performance event of the part that is the same as the part that is performed by the performer using the keyboard system 20, the sound source 28 is controlled so as to make the volume low.

Incidentally, in the case where the performance event that is at the current time is the performance event of the part that is the same as the part that is performed by the performer using the keyboard system 20, the process is not limited to the lowering of the volume of the sound source 28 as has been described above and the process may be controlled so as to change the tone or to change the tone together with lowering the volume.

When the processing of Step S304 is finished, the process proceeds to Step S306 and a determination is made as to whether or not the part of the performance event that has been executed in Step S304 is the same part as the part that the performer performs using the keyboard system 20.

In this Step S306, in the case where it has been determined that the part of the performance event that has been executed in Step S304 is the same part as the part that the performer performs using the keyboard 20, the process proceeds to the processing of Step S308 and a determination is made as to whether or not the Notes On and Notes Off of the performance data (performance event) that have been read out from the performance memory 18 and the Notes On and Notes Off that are the performance data due to the key pressing operations and the key releasing operations are in agreement.

In this preferred embodiment, with regard to the specifics for the determination processing of Step S308, the Notes On in accordance with the four immediately preceding key pressing operations of the keyboard system 20 and the Notes Off in accordance with the four key releasing operations are stored in the working memory 16 and, in the case where the performance data that have been read out from the performance data memory 18 are the Note On data, the pitch and timing of the Notes On in accordance with the four immediately preceding key pressing operations are each compared with the pitch and timing of the Notes On that have been read out from the performance data memory 18 and a determination is made as to whether or not they are in agreement. In addition, in the case where the performance data that have been read out from the performance data memory 18 are the Note Off data, the pitch and timing of the Notes Off in accordance with the four immediately preceding key pressing operations are each compared with the pitch and timing of the Notes Off that have been read out from the performance data memory 18 and a determination is made as to whether or not they are in agreement.

Incidentally, in the determination processing of Step S308, in the same manner as in the determination processing of Step S202 that was discussed above, for the determination as to whether or not the timing is in agreement, an allowable range for the timing variation is established and, if the timing variation is within said allowable range it is viewed as being in agreement.

In addition, in the same manner as in the case of the determination processing of Step S202 that has been described above, in the processing of Step S308, it is preferable to set the allowable range of variation between the timing of the Note On in accordance with the key pressing operation of the keyboard system 20 and the timing of the Note On of the performance data that have been read out from the performance data memory 18 narrow and to set the allowable range of variation between the timing of the Note Off in accordance with the key pressing operation of the keyboard system 20 and the timing of the Note Off of the performance data that have been read out from the performance data memory 18 wide. The above mentioned allowable range is established so that it is possible to set it to any value desired by means of a specified operator that is comprised by the operator group 22. Accordingly, the performer may set the value of the allowable range as desired to conform to his or her own level of performance technique.

Incidentally, with regard to the agreement determination processing of this Step 308 also, in the same manner as was explained for the agreement processing of Step S202 of the flowchart that is shown in the key pressing and key releasing insertion processing of FIG. 2 described above, this preferred embodiment may be made in a variety of forms.

Then, in the determination processing of Step S308, no matter whether there is a Note On of the performance event that is read out from the performance data memory 18 and executed as the automatic performance, as in the case where there is no Note On in accordance with the key pressing operation of the keyboard system 20, in the case where a determination has been made that the Notes On and Notes Off of the performance data that have been read out from the performance data memory 18 and the Notes On and Notes Off in accordance with the key pressing operations of the keyboard system 20 are not in agreement, the process proceeds to Step S310 and a determination is made as to whether or not the value of the Di Tick register is 0.

In the determination processing of this Step S310, in the case where it has been determined that the value of the Di Tick register is 0, the process proceeds to Step S312 and the value of the Tick register which indicates the current time is stored in the Di Tick register.

Then, when the processing of Step S312 that has been described above is finished, the process proceeds to the processing of Step S318.

On the other hand, in the case where, in the determination processing of Step S308, a determination has been made that the Notes On and the Notes Off of the performance data that have been read out from the performance data memory 18 and the Notes On and the Notes off in accordance with the key pressing operation of the keyboard system 20 are in agreement, the process proceeds to the processing of Step S314 and the value of the Di Tick register is cleared to 0.

Then, when the processing of the above mentioned Step S314 is finished, the process proceeds to the processing of Step S302.

In addition, in the case where, in the determination processing of Step S302, a determination has been made that the value of the Tick register which indicates the current time and the value of the Event register are not in agreement, in the case where, in the determination processing of Step S306, a determination has been made that the part of the performance event that has been executed in Step S304 is not the same as the part that the performer performs using the keyboard system 20 and in the case where, in the determination processing of Step 310, a determination has been made that the value of the Di Tick register is not 0, the process proceeds to the determination processing of Step S316 and a determination is made as to whether or not the passage of time from the time that the value of the Di Tick register indicates to the current time has passed a specified time and has become Time Over.

Incidentally, with regard to the above mentioned specified time that becomes the Time Over, it is possible to set any time desired by means of a specified operator that is comprised by the operator group 22. Accordingly, it is possible for the performer to set the specified time for the Time Over as desired to conform to the level of his or her own performance technique.

In the determination processing of this Step S316, in the case where a determination has been made that the passage of time from the time that the Di Tick register indicates to the current time has not passed a specified time and has not become Time Over, the process proceeds to the processing of Step S318.

Then, in the processing of Step S318, a determination is made as to whether or not the value of the Tick register which indicates the current time and the value of the Event register are in agreement.

Here, in the case where a multiple number of performance events for the current time that is indicated by the Tick register and performance events exist that have not yet been carried out by the processing in Step S304 and below, a determination is made in the determination processing of Step S318 that the value of the Tick register which indicates the current time and the value of the event register are in agreement, the process returns to Step S304 and the processing related to the next performance event is carried out.

On the other hand, in the case where the processing in Step S304 and below has been carried out for all of the performance events that exist for the current time that is indicated by the Tick register, a determination is made in the determination processing of Step S318 that the value of the Tick register which indicates the current time and the value of the Event register are not in agreement and the process proceeds to the processing of Step S320.

Then, in the processing of Step S320, the value of the Tick register which indicates the current time is incremented by 1 only and the processing of this flowchart terminates.

On the other hand, in the case where, in the determination processing of Step S316, a determination has been made that the passage of time from the time that is indicated by the Di Tick register to the current time has passed a specified time and has become Time Over, the process proceeds to the processing of Step S322 and the automatic performance in accordance with the read-out of the performance data from the performance data memory 18 stops.

With regard to the specifics for the processing of Step S322 in this preferred embodiment, the execution of the Tick insertion processing terminates.

Accordingly, in accordance with this electronic musical instrument, in the case where the part that the performer performs with the key pressing operations and the key releasing operations of the keyboard system 20 and the part of the performance data that have been read out from the performance data memory 18 are in agreement and, moreover, the Notes On and the Notes Off of the performance data that have been read out from the performance data memory 18 and the Notes On and the Notes Off in accordance with the key pressing operation and the key releasing operation of the keyboard system 20 are in agreement, the value of the Di Tick register is cleared to 0 (Step S202–Step S204 and Step S308–Step S314). Since the advance to the processing of Step S316 ceases, there is no automatic termination of the automatic performance in accordance with the read-out of the performance data from the performance data memory 18.

On the other hand, in accordance with this electronic musical instrument, when the part that the performer performs with the key pressing operations and the key releasing operations of the keyboard system 20 and the part of the performance data that have been read out from the performance data memory 18 are no longer in agreement and the Notes On and the Notes Off of the performance data that have been read out from the performance data memory 18 and the Notes On and the Notes Off in accordance with the key pressing operation and the key releasing operation of the keyboard system 20 are no longer in agreement, the value of the Tick register which indicates the current time is stored in the Di Tick register (Step S202–Step S206–Step S208 and Step S308–Step S310–Step S312). Because of this, the process proceeds to the processing of Step S316 and, in the case where said time that has come to no longer be in agreement passes a specified time, the automatic performance in accordance with the read-out of the performance data from the performance data memory 18 is stopped automatically (Step S316–Step S322).

In other words, in the manner that has been described as above, in this electronic musical instrument, a comparison observation is made between the automatic performance in accordance with the read-out of the performance data from the performance data memory 18 and the performance by the performer using the keyboard system 20. In the case where a state in which the automatic performance in accordance with the read-out of the performance data from the performance data memory 18 and the performance by the performer using the keyboard system 20 are not in agreement, the automatic performance in accordance with the read-out of the performance data from the performance data memory 18 is stopped automatically. The non-agreement of the automatic performance according to data from memory 18 and the performer's performance may include, for example, a state in which, even though the automatic performance in accordance with the read-out from the performance data memory 18 is being carried out, the performance by the performer using the keyboard system 20 is not done and has continued for a specified period of time or more, In addition, since the stopping of the automatic performance in accordance with the read-out of the performance data from the performance data memory 18 is controlled by means of the comparison observation that is made between the automatic performance in accordance with the read-out of the performance data from the performance data memory 18 and the performance by the performer using the keyboard system 20, the automatic stopping of the automatic performance in accordance with the read-out of the performance data from the performance data memory 18 is prevented in such portions as the prelude or the intermezzo without the necessity for carrying out a keyboard system 20 performance.

In this manner, the automatic performance in accordance with the read-out of the performance data from the performance data memory 18 is stopped automatically only in the case where the performance of the performer by means of the keyboard system 20 has been interrupted for a specified period of time or the performance of the performer by means of the keyboard system 20 and the automatic performance in accordance with the read-out of the performance data from the performance data memory 18 have not been in agreement for a specified period of time.

In addition, in the above mentioned preferred embodiment, even in the case where the performer can perform without making a mistake matching the automatic performance in accordance with the read-out of the performance data from the performance data memory 18, since the performer, by merely interrupting the performance, automatically stops the automatic performance in accordance with the read-out of the performance data from the performance data memory 18, it is possible for the performer to omit the procedure of operating the stop button and the operability of the electronic musical instrument can be improved.

Incidentally, in the above mentioned preferred embodiment, in those cases where a determination has been made that a specified period of time has passed and it has become Time Over, the automatic performance in accordance with the read-out of the performance data from the performance data memory 18 is automatically stopped (Step S316–Step S322). However, the invention is not limited to this and embodiments of the invention may be made so that, in the case where, when a specified operator has been turned on, a determination is made that it becomes Time Over with the passage of a specified period of time and the automatic performance in accordance with the read-out of the performance data from the performance data memory 18 is stopped automatically or in the case also where, when a specified operator is turned off, a determination is made that it becomes Time Over with the passage of a specified period of time and the automatic performance in accordance with the read-out of the performance data from the performance data memory 18 is automatically stopped.

Since the present invention is configured in the manner described above, it is possible to automatically stop the automatic performance by means of automatic performance techniques in conformance with the performance state by the performer and, thus, it demonstrates the superior efficacy that it is possible to alleviate the stress of the performer.

What is claimed is:

1. An electronic musical apparatus comprising:
    a storage device in which automatic performance data are stored;
    an automatic performance system for performing the automatic performance data;
    an input device for accepting input performance data;
    a comparator for comparing the automatic performance data to the input performance data; and an automatic performance termination control for terminating the performance of the automatic performance data when the comparator has detected a mismatch between the automatic performance data and the input performance data, said mismatch having persisted for a pre-determined time.

2. An electronic musical apparatus as in claim 1 wherein the storage device is RAM, ROM, hard disk or floppy disk.

3. An electronic musical apparatus as in claim 1 wherein the automatic performance system comprises:
   a central processing unit (CPU) for receiving automatic performance data from the storage means;
   a sound source for receiving performance data from the CPU and generating a digital musical tone signal;
   a digital to analog converter for accepting the digital musical tone signal and producing an analog musical tone signal;
   an amplifier for receiving the analog musical tone signal and producing an amplified analog musical tone signal; and
   a speaker for receiving the amplified analog signal and producing a musical tone signal.

4. An electronic musical apparatus as in claim 1 wherein the input device comprises a musical keyboard.

5. An electronic musical apparatus as in claim 1 wherein the input device comprises a percussion instrument simulator, a string instrument simulator, a computer keyboard or a mouse.

6. An electronic musical apparatus as in claim 1 wherein the comparator further comprises:
   a central processing unit (CPU) for receiving input performance data and automatic performance data;
   a timer for use by the CPU and program to make timing measurements; and
   a computer program for timing input performance data and comparing input performance data to automatic performance data.

7. An electronic musical instrument as in claim 6 wherein the program for comparing input performance data comprises:
   a first program portion that compares data representing at least one note of the input performance data with the data representing at least one note of the automatic performance data;
   a second program portion that stores a time that at least one of the input performance data differed from the automatic performance data.

8. An electronic musical instrument as in claim 6 wherein the first program portion compares automatic performance data pitch and performance data pitch.

9. An electronic musical instrument as in claim 6 wherein the first program portion compares automatic performance data interval to input performance data interval.

10. An electronic musical instrument as in claim 6 wherein the first program portion compares input performance data timing to the automatic performance data timing.

11. A musical instrument as in claim 7 wherein the second program portion resets an error timer if data representing the most recent four notes of the input data match the data representing the four most recent notes of the automatic performance data.

12. An electronic musical apparatus as in claim 1 wherein the mismatch comprises a mismatch of any of four of a previous four input data.

13. A method for terminating a musical accompaniment comprising:
   inputting performance data;
   retrieving automatic performance data from a storage device;
   performing the automatic performance data;
   comparing the automatic performance data with the input performance data to find a mismatch between the automatic performance data and the input performance data;
   determining if the mismatch has persisted beyond a pre-determined time; and
   terminating the performance of the automatic performance data if the mismatch persists the pre-determined time.

14. A method as in claim 13 wherein the inputting of performance data comprises inputting key presses from a musical keyboard.

15. A method as in claim 13 wherein inputting performance data is inputting data from a percussion instrument simulator, inputting data from a string instrument simulator, inputting data from a computer keyboard or inputting data from a computer mouse.

16. A method as in claim 13 wherein comparing the automatic performance data and the input performance data comprises comparing pitch.

17. A method as in claim 13 wherein comparing the automatic performance data and the input performance data further comprises comparing the time between corresponding successive notes.

18. A method as in claim 13 wherein determining if the mismatch found between the automatic performance data and the input performance data persisted beyond a pre-determined time comprises determining if a mismatch persisted in four most recent input data representing musical notes.

19. A method for terminating a musical accompaniment comprising:
   inputting performance data;
   retrieving automatic performance data from a storage device;
   performing the automatic performance data;
   comparing the automatic performance data with the input performance data to find a mismatch between the automatic performance data and the input performance data;
   determining timing variations between mismatched automatic performance data and input performance data; and
   terminating the performance of the automatic performance data when the mismatch exceeds a selected time.

20. A method as in claim 19, wherein determining timing variations between the automatic performance data and the input performance data comprises determining timing variations in four most recent input data representing musical notes.

* * * * *